United States Patent [19] [11] Patent Number: 5,414,698
Adams [45] Date of Patent: May 9, 1995

[54] METHOD OF COMMUNICATION

[75] Inventor: John L. Adams, Suffolk, England

[73] Assignee: British Telecommunications public limited company, London, England

[21] Appl. No.: 142,401

[22] PCT Filed: Aug. 7, 1992

[86] PCT No.: PCT/GB92/01476
§ 371 Date: Nov. 24, 1993
§ 102(e) Date: Nov. 24, 1993

[87] PCT Pub. No.: WO93/03568
PCT Pub. Date: Feb. 18, 1993

[30] Foreign Application Priority Data
Aug. 8, 1991 [GB] United Kingdom ............... 9117172

[51] Int. Cl.6 .................................... H04L 12/56
[52] U.S. Cl. ............................. 370/17; 370/60; 370/85.9; 370/94.1
[58] Field of Search ............. 370/94.1, 17, 85.9, 370/60

[56] References Cited
U.S. PATENT DOCUMENTS
4,577,312  3/1986  Nash ............................. 370/79
5,293,378  3/1994  Shimizu ......................... 370/94.1
5,303,232  4/1994  Proctor et al. .................. 370/60

FOREIGN PATENT DOCUMENTS
8504300  9/1985  WIPO .
9012467  10/1990  WIPO .

OTHER PUBLICATIONS
Patent Abstracts of Japan, Vo. 14, No. 336, Jul., 1990, JP A 21 13 747.

Primary Examiner—Douglas W. Olms
Assistant Examiner—Russell Blum
Attorney, Agent, or Firm—Nixon & Vanderhye

[57] ABSTRACT

A communications system including a node connected via an ATM connection to a cell Synchronization and Recovery Unit. This allows a number of lower bit rate paths (e.g. n×64 kbit/s) to be utilized via a switching center. Another synchronization and recovery unit is connected through an ATM link to a selected recipient interface. A method is provided in which distinct first header portions in idle cells are used to determine the cyclic order in which the ATM cell portions are transmitted down paths and to determine the delay experienced through the paths in order to reconstruct the cells from the portions received from the respective paths. The units determine the delay experienced through the paths and reconstruct cells from the portions passed through respective paths. A personal identification number can be assigned a customer to allow access from one of a number of points and to select a desired service via a control point.

8 Claims, 3 Drawing Sheets

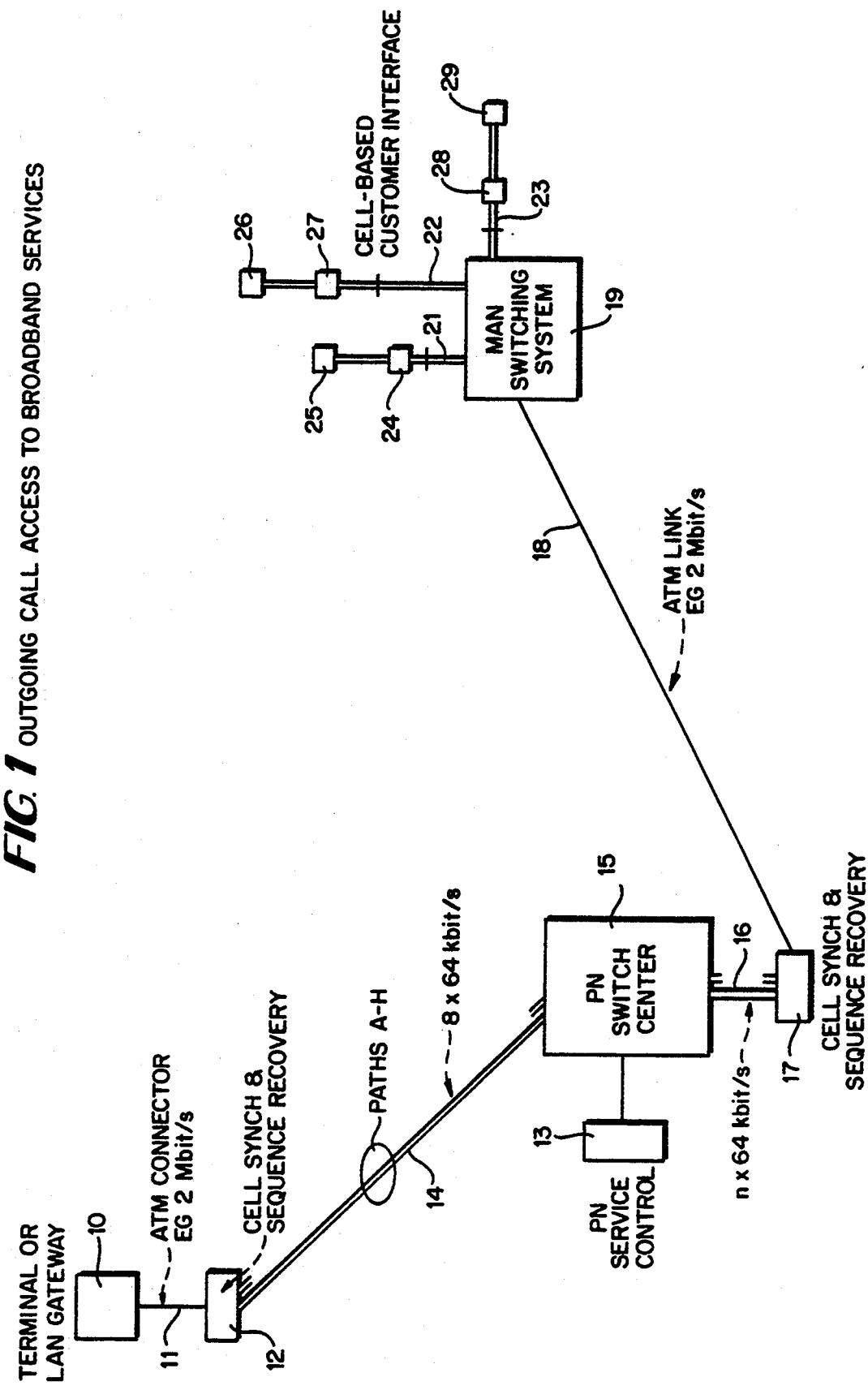
FIG. 1 OUTGOING CALL ACCESS TO BROADBAND SERVICES

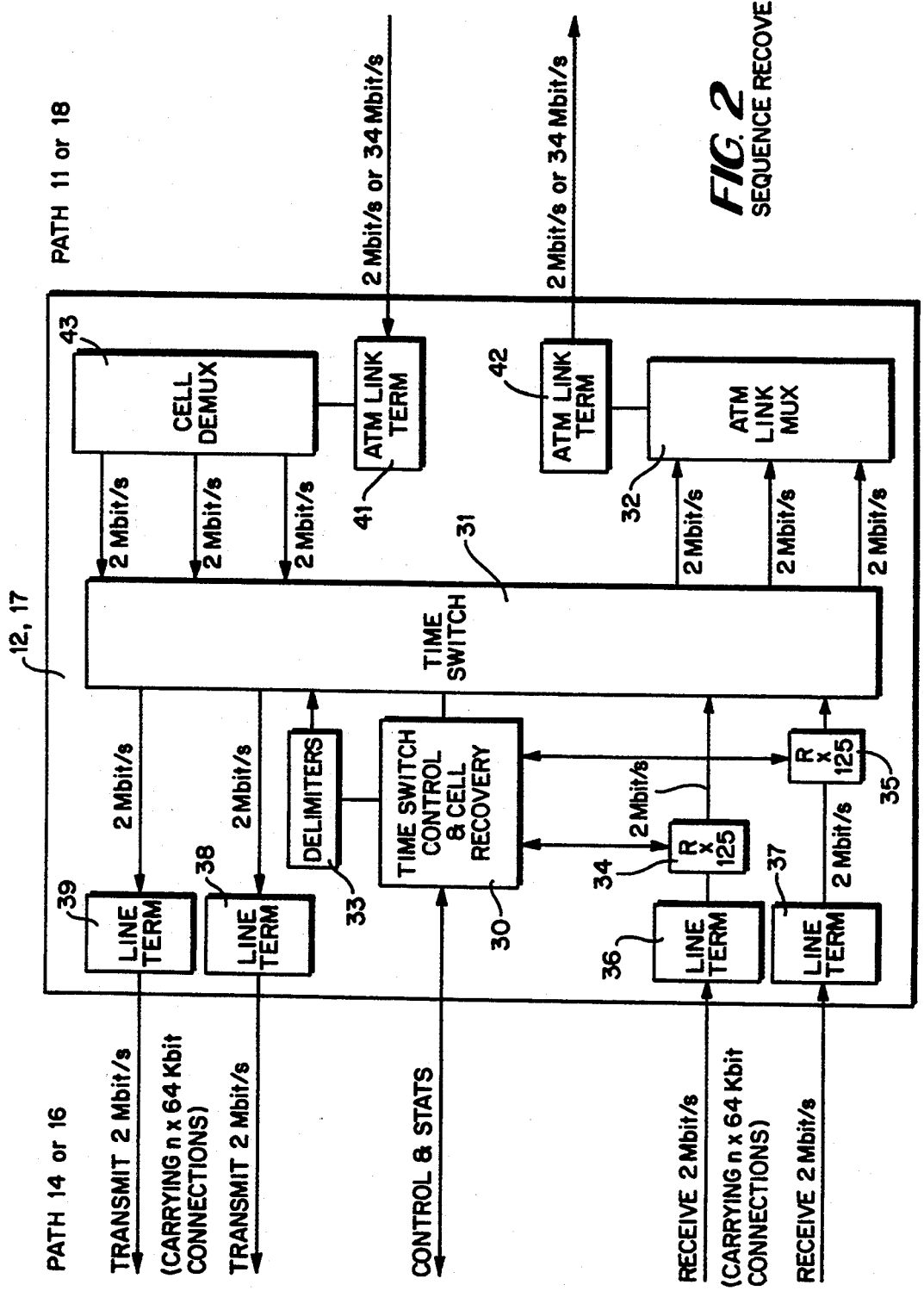

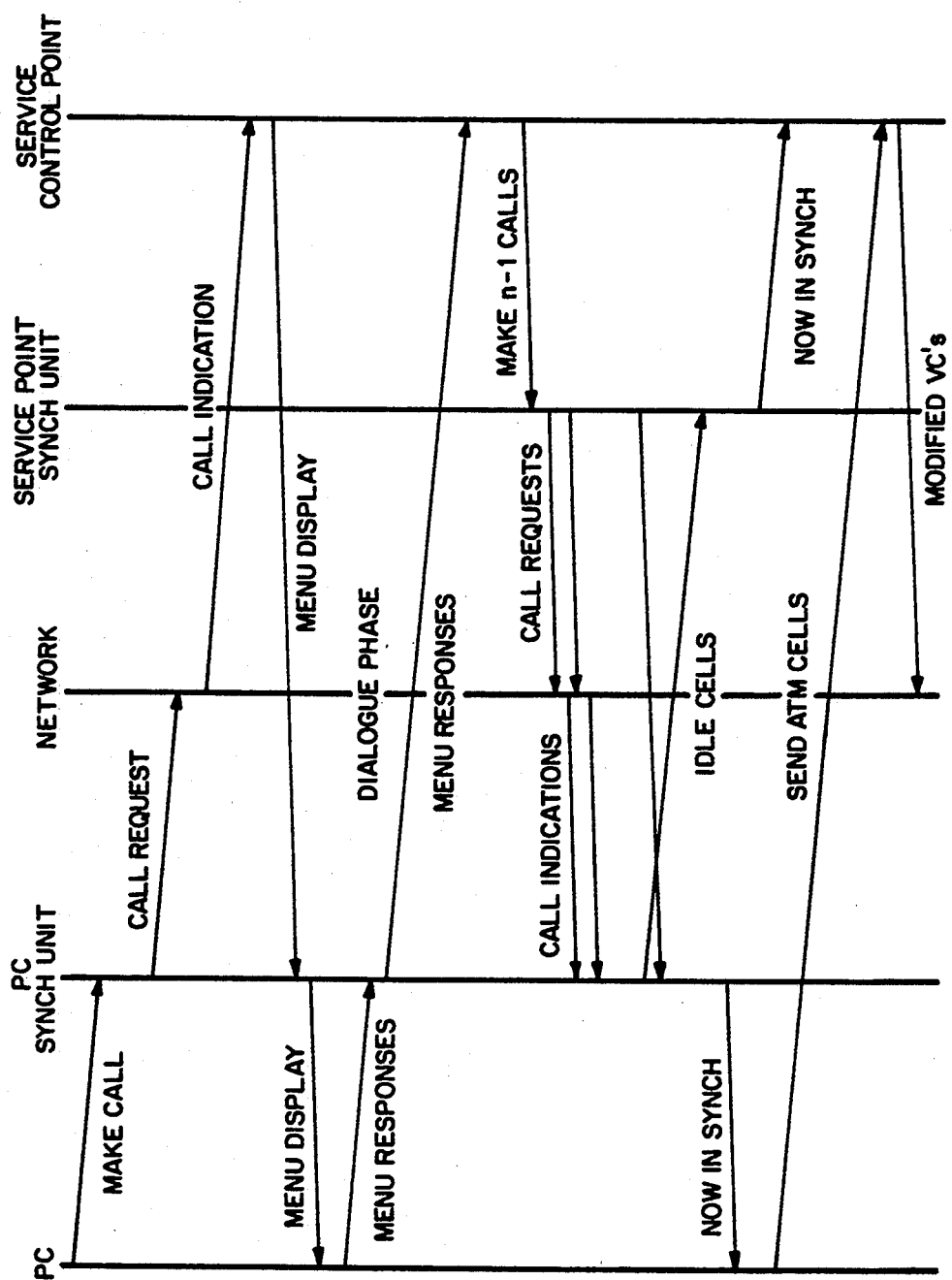

METHOD OF COMMUNICATION

FIELD OF THE INVENTION

This invention relates to a method of communicating a digital broadband signal in the form of a series of cells, each cell being formed by m portions, between a transmitter and a receiver via a plurality, n, of narrow band communications paths, each path having an arbitrary propagation time, in which successive portions of the cells are propagated along the paths in a fixed cyclic order. When using this technique, it is necessary to establish the cyclic order of the paths used, so the receiver can order the received portions in the correct order. Further, the different paths may have arbitrary propagation times, and it therefore becomes necessary to determine what the relative delays are, in order to re-establish the proper sequence of the portions that are transmitted down the paths.

BACKGROUND OF THE INVENTION

One method of handling high data rate traffic (voice, computer or TV for example) is to have a communications ring (eg ORWELL) or a bus (eg a Distributed Queue Dual Bus DQDB) to provide a Local Area Network (LAN) or Wide Area Network (WAN) service. Such data is carried as packets through the network. With Asynchronous Transfer Mode (ATM) or DQDB configurations, the packets are designated as cells each of which can be considered to be made up of portions, for example 8-bit octets, for example a cell might be made up of 53, 8-bit octets.

One method of communicating a high data rate signal down several lower data rate paths is disclosed in PCT patent application WO 90/12467 published on 18th Oct. 1990, in which the differences in propagation time are compensated by transmitting a flag down each path, and by individually delaying the received signals in the receiver in response to the received flags, so that the broadband signal can be re-established from the portions by multiplexing.

Further, each flag is distinctive of each distinct path, so the receiver can identify the cyclic order of the paths from the flag information.

Standard ATM data formats, amongst other formats, for communication on a single high bandwidth path guarantees proper cell sequence order at a receiver. There is, therefore, no requirement for a mechanism identifying cells by any sequence identifier, for example a cell number, in standard ATM formats and so none is provided.

A disadvantage of above described multi-path communication method, if it were to be applied to present ATM communications standards, is that the flags would have to be added to the data stream, and their form and their content would need to be standardised if open communications are needed.

SUMMARY OF THE INVENTION

According to a first aspect of the present invention a method of communicating a digital broadband signal according to the preamble of claim 1 is characterised in that:
each idle cell includes a header having a first header portion which is the same in each idle cell and unique to the header, and in that the receiver determines the cyclic order from the order of arrival at the receiver of the first header portions of successive idle cells and the values of m and n.

According to a second aspect of the present invention, a method of communication according to the preamble of claim 2 is characterised in that:
each idle cell includes a header having a first header portion which is the same in each idle cell and unique to the header, and in that the relative delays of the propagation times of the other paths relative to a given one of the paths is determined from the arrival times of the first header portions of the headers received from the paths.

These aspects of the present invention provide a method of determining the cyclic order of the paths and, if necessary, the relative delays of the paths during the initial set-up of a communications link from idle cells without recourse to adding special patterns into the information field of cells or transmitting additional path identifiers. This permits, for example, standard ATM data signals to be communicated down multi-path links transparently. That is, the originator of the signal need not have prior knowledge of the nature of the ATM link to be used —it could be a high data rate link or a multi-path link— as no information needs to be added to the data signal to allow a multi-path communication link to be established and used.

The portions from the paths are subjected to delays such that the portions of a cell may be retrieved in the order in which they were transmitted.

If the header of each idle cell includes a second header portion characteristic of the idle cell header, the arrival of the second portion from a path can be used to confirm the reception of a first portion from that path. This will allow some errors in the detection of the first header portion to be discovered.

BRIEF DESCRIPTION OF THE DRAWINGS

The invention will now be described, by way of example only, with reference to the accompanying drawings in which:

FIG. 1 is a schematic diagram of a configuration for providing broadband services according to the present invention;

FIG. 2 is a schematic diagram of a sequence recovery unit employed in FIG. 1; and FIG. 3 is a diagram showing the steps associated with service selection and the transmission of cells in the configuration of FIG. 1.

DETAILED DESCRIPTION OF THE DRAWINGS

The configuration shown in FIG. 1 provides the availability of high data rate services without necessarily having access to the Broadband Integrated Services Digital Network (B-ISDN). In this example a customer with a Personal Identification Number (PN) can have access to switched high speed services.

A LAN gateway node 10 is shown with an ATM network connector 11. The gateway 10 could be replaced with a terminal, for example a personal computer (PC).

The connector 11 is a 2M bit/s connector based on the Broadband-Integrated Services Digital Network (B-ISDN) user-network interface (UNI) for the ATM layer, adaption layer, signalling and metasignalling functions.

The 2M bit/s connector 11 could, alternatively, be based on the IEEE802.6 Metropolitan Network Area (MAN) standard for the subscriber-network interface (SNI). In this case the user payload would be carried in DQDB cells.

The high bit rate connector 11 is connected to a cell synchronising and sequence recovery unit 12. This unit 12 allows connection to a number, n, of lower bit rate, parallel paths 14 to provide the desired bandwidth or capacity (n×64 kbits) in a selected configuration.

The sequence recovery units 12, 17 are arranged to break the cells down into portions, conveniently 8-bit octets, and transmit successive portions of each cell down a different path.

Each ATM cell in this embodiment has a total length of 53 octets which are transmitted by sending the first octet via a first path, the second octet via a second path, and so on. After all 53 octets of the cell have been sent, the first octet of the next cell is transmitted down whichever path is the next logical one in the cycle. In the case of FIG. 1, it is assumed that n=8 (with labelled paths A to H), and that the paths are used in the cyclic order A to H.

The paths 14 are connected to a PN switch centre 15 which switches the eight incoming paths 14 to eight outgoing paths 16. The number of parallel paths 14, 16 required will depend on the bandwidth requirements of the particular service selected by the customer via a PN service control unit 13.

The peak bit-rate required by the node 10 is assumed to be 8×64 kbit/s, including cell overheads.

The idle cells of the data signal from the terminal 10 are used to set up the link in the following manner.

A typical ATM idle cell structure is as follows:

| Octet01 | Octet02 | Octet03 | Octet04 | Octet05 |
|---------|---------|---------|---------|---------|
| 00000000 | 00000000 | 00000000 | 00000001 | HEC | followed by an information field.

The total length of the ATM cell is assumed to be 53 octets (ie m=53). Considering now how the header octets 01 to 05 of successive idle cells arrive after being sent over the eight paths 14 in the cyclic order [A, B, . . . G, H, A, . . . ]. One can determine that they are received by the PN switch centre 15 from the paths 14 as listed at Table 1, assuming the transmission started with path A and omitting the non-header octets.

TABLE 1

| CELL | PATH | | | | | | | |
|------|----|----|----|----|----|----|----|----|
|      | A  | B  | C  | D  | E  | F  | G  | H  |
| 1st  | 01 | 02 | 03 | 04 | 05 |    |    |    |
| 2nd  | 04 | 05 |    |    |    | 01 | 02 | 03 |
| 3rd  |    |    | 01 | 02 | 03 | 04 | 05 |    |
| 4th  | 02 | 03 | 04 | 05 |    |    |    | 01 |
| 5th  | 05 |    |    |    | 01 | 02 | 03 | 04 |
| 6th  |    | 01 | 02 | 03 | 04 | 05 |    |    |
| 7th  | 03 | 04 | 05 |    |    |    | 01 | 02 |
| 8th  |    |    |    | 01 | 02 | 03 | 04 | 05 |

The values of m and n are known to the switch centre 15, so a determination can be made of the paths in which the successive occurrences of the same header octet will arrive. More precisely, the equivalent octet of the next idle cell will arrive in the path which is rem(m/n) paths along the cyclic order from the last path. If the last path was allotted number "a", say, the next path is numbered as path [a+rem(m/n)] modulo n; (where "rem" is the remainder of the quotient).

Once all the paths have been numbered, the numbers denote the cyclic order.

The arrival order of a characteristic header octet of the idle cells can therefore be used to determine the cyclic order of the paths without any data being added to the ATM cells.

In Table 1, the characteristic first header octet will be considered to be the 04 octet. When the PN switch centre 15 first detects an 04 octet, path "D" in table 1, it numbers the path as path number 1. The next path on which an 04 octet is subsequently received is numbered $$[1+\text{rem}(53/8)]\text{modulo } 8 = 6,$$

the next as $$[6+\text{rem}(53/8)]\text{modulo } 8 = 3,$$

and so on.

The path identification when completed for the above particular example is as follows: path A=6, path B=7, path C=8, path D=1, path E=2, path F=3, path G=4, path H=5.

If the first 04 octet had been first received from a path other than path D, the numbers allocated to the paths would be different, but the paths would nevertheless be numbered in the same cyclic order.

Each time a new path is detected, the relative difference of the propagation time with respect to that of the first path (path D in the above example) can be determined. For example, the next occurrence of an 04 octet is, in the above example, on path A and it will arrive 5 octet periods after path 1 receives its 6th next octet if the paths have equal propagation times. Any deviation from the expected time of arrival provides a measure of the relative propagation delay for path 6 (path A) with respect to path 1 (path D). This process is carried out on all eight paths 14 as the cyclic order is recovered.

This procedure also recovers the cell boundaries since it may now be predicted when, and on which path, the next 04 octet is transmitted. Hence, the end of the procedure can invoke a 'now in sync' message as will be discussed below.

When any path should carry an 04 octet, then the same path carries an 05 octet three cells later in this example. This displacement is 21 octets; so, after observing an 04 octet, an 05 octet should be received on the same path 21 octets later. This can be used to confirm that the 04 octet detected on a given path was not a corruption error.

In general, a single path identity is recovered per cell, and hence n paths require n cells plus the 04 to 05 displacement period (which is a function of n). For example, for n=8 the sync process takes 10 cells, equal to 70 octets transmitted on path D after the first 04 octet (ie about 9 milliseconds).

The paths 16 connect to a further cell synchronisation and sequence recovery unit 17 which adjusts the received sequence to replicate that originally transmitted from the node 10. The data signal can thus be sent on a normal ATM link 18 to a MAN switch 19 which switches the traffic to the desired high rate path 21, 22 or 23 and hence to the desired customer interface 24–29.

The sequence recovery units 12, 17 are configured to handle the cells and to ensure that they are arranged to be synchronised to the sequence as generated, having taken into account the various delays experienced in the respective paths via the plurality of paths 14 and 16.

Routing of the connection will operate according to the setting of a Virtual Path Identifier (VPI) and a Virtual Connection Identifier (VCI) within the cell header.

The unit for such operations is configured as shown in FIG. 2.

A microprocessor based time switch control and cell recovery block 30 performs the path labelling and delay analysis. It also controls the connections through a time switch 31 to pass the octets in correct sequence order down a 2M bit/s link to the buffer of an ATM Link Multiplexer 32.

The block 30 has the capability of modifying some of the octets (eg the VCI and VPI fields) by passing information from a "delimiters" unit 33 through the time switch 31 and into the octet stream of a cell. The delimiters unit 33 also places flags in the octet stream to provide cell boundary information to the ATM Link Mux 32.

The delimiters unit 33 can be loaded with VPI/VCI information via the control and stats interface of the microprocessor block 30.

Path delays are compensated for under the control of the microprocessor using R×125 microsecond delay units 34, 35. Each 64 kbit/s time-slot in a 2M bit/s system can be separately delayed into another 125 microsecond frame by varying its value of R.

The function of the ATM Link Mux 32 is to buffer the various cells arriving in parallel on separate 2M bit/s outputs of the time of the time switch 31. It also ensures that each virtual connection is given an appropriate minimum guaranteed bandwidth as agreed in the dialogue phase with the PN customer (described below). The minimum guarantee values are passed to the ATM Link Mux 32 via the control and stats interface of the microprocessor block 30.

Cells received from the broadband network are passed towards the time switch 31 via the cell demultiplexers 43 on a particular 2M bit/s interface, depending on the VPI/VCI value. The delimiters unit 33 can be used to alter this value in the emerging octet stream at the outlet of the time switch 31. From here the octets are passed towards the PN customer over a 2M bit/s connection into the PN service control switch of FIG. 1.

The external 2M bit/s systems are all terminated on line termination units 36–39 which perform the correct physical layer termination functions for a 2M bit/s system. Similarly the external ATM links are also terminated on units 41, which perform the physical layer termination of cell-based transmission systems.

A more detailed operational example will be described with reference to the sequence of FIG. 3 and the overall system of FIG. 1.

High speed data services for customers, such as PN customers are required even when cell based networks may only be available in specific localities. For example, the customer will want access via Narrowband Integrated Services Digital Network (N-ISDN) interfaces.

One main difference between a purely private network and a PN service is the dial-up nature of the paths through the narrowband network towards the cell switch. The bit-rates of each link shown may be typical for many private networks, the PN customer has an advantage from a dial-up connection whenever;
the traffic at his home location does not justify a semi-permanent connection, or
he must visit sites where there are already other PN customers to justify the provision of the high-speed terminal equipment, but the call he wishes to make is not frequently required at that site.

The dial-up part of the connection is processed at the boundary between the narrowband network and cell-based network. At this point the customer's cells are recovered, and passed on to the cell network with modified headers as necessary for the service required. For example the managed VC service would now operate according to the setting of the Virtual Path Identifier (VPI) and Virtual Connection Identifier (VCI) in the cell header. These would be processed according to information stored in the cell switch 15 following negotiations between the managed VC service and the PN service control point 13. In other words the PN service control point 13 appears to the managed VC service like any other cell based customer connected to the network and owns a set of VC values which the network permits it to use.

The PN service control point modifies the headers from the PN customer's terminal according to a table specifying which of its permitted VC values is assigned to each PN. This avoids the need for sending control information over the narrowband network to specify a VC value which the terminal should use. Any VC value can be used by the terminal and it is only necessary that the PN customer has informed the service control point the desired destination and bit-rate required.

As with other PN services the initial dialogue between the customer and the service control point may take the form of a menu driven sequence. This would typically involve the customer first dialling up the service control point 13 and identifying himself with a personal identity number. During this phase he has a single 64 kbit/s connection extended between his terminal and the service control point. By transmitting digits in response to the menu questions he can now select services.

For broadband services the same technique is used to specify that he wanted a connection via a managed VC. The menu may take the form:
  dial '1' for John Adams
  dial '2' for Marion Skinner
  dial '3' for the SMDS (Switched Multimegabit Data Service)
and so on, ie a form of short-code dialling customised for each PN. There may be secure or non-secure (destination addressed) VC's in this table according to the privileges of the PN.

Menus for fast set-ups can be provided, for example
  dial '1' for the SMDS service
  dial '2' for all other options
which can be presented early in the menu sequence for fast set-ups to SMDS. Note also that the SMDS cells have a standard VCI/VPI in which every bit has the value '1'.

The PN service point may now call up the customer on n−1 further connections as specified against the table entry for specific VC's etc. Once these are established an cell sync has been obtained, the customer can transfer cells toward the service control point using any VCI/VPI value in the header.

After recovery of the cells in correct sequence order, the service control point modifies the VCI/VPI value as required. For example, if the VPI/VCI of each cell now has every bit set to the value '1' the cell will automatically be steered through the cell switch to the SMDS router and from there to the desired terminal.

Thus the PN customer may use this type of service, for example, to gain access to a computer in his home location and transfer data or still images to his present location. Also for multimedia calls, only a number of fixed bit-rate links over the narrowband network could be established for each of the media at the beginning of the call. Because of the limitations of the signalling between the PN and the service control point, it would be necessary to establish all these connections according to some table entry in the service point. Nevertheless the PC customer could obtain a low bit-rate video channel plus a data control channel to demonstrate such video information stored in his home site.

From his PC, the PN customer operates some software to connect to the service control point. Within this software he accesses the 'make call' mode which activates a call sender in the cell sync & sequence recovery unit to initiate the dialogue phases with the PN service control point. This phase is shown in FIG. 3 with the 'make call' module subsequently going through some parts of the service control point menu automatically.

Hidden from the customer, the 'make call' module also initiates some synchronisation activity in the customer's sequence recovery unit. This activity initiates the transmission of the ATM idle cells through cycling the octets over n outgoing 64 kbit/s connections. This activity starts once the equipment has detected and answered incoming call indications on n−1 connections. The sync unit 12 now starts to analyze the received octets on all incoming connections looking for a pattern equivalent to idle cells.

Similarly the execution of the menu at the service control point causes n−1 connections to be established. Even before the incoming call indications are received by the PN's equipment, the sync unit 17 starts playing out idle cells over the n connections. It also examines received octets looking for a pattern equivalent to idle cells.

Once the receiver 12 has detected the correct pattern for a number of successive idle cells, it indicates 'now in sync' back to the 'make cell' module (as shown in FIG. 3). The module now completes its execution with a suitable indication to the customer. He is now in the position of having a managed VC connection to the desired terminal and can execute another module to initiate command sequences or data transfer towards his home site. It may be assumed that software at his home site is in the equivalent of a 'wait' state for this VC and will be woken up by any valid message he sends over the VC.

It is claimed:

1. A method of communicating a digital broadband signal—in the form of a series of cells, including a series of idle cells, each cell being formed by m portions—between a transmitter and a receiver via a plurality, n, of narrow band communications paths, each path having an arbitrary propagation time, in which successive portions of the cells are propagated along the paths in a fixed cyclic order with each successive portion being propagated along the next path in the cycle, wherein said method is characterised in that:

each idle cell includes a header having a first header portion which is the same in each idle cell and unique to the header, and in that the receiver determines the cyclic order from the order of arrival at the receiver of the first header portions of successive idle cells and the values of m and n.

2. A method of communicating a digital broadband signal—in the form of a series of cells, including a series of idle cells, each cell being formed by m portions—between a transmitter and a receiver via a plurality, n, of narrow band communications paths, each path having an arbitrary propagation time, in which successive portions of the cells are propagated along the paths in a fixed cyclic order, wherein said method is characterised in that:

each idle cell includes a header having a first header portion which is the same in each idle cell and unique to the header, and in that the relative delays of the propagation times of the other paths relative to a given one of the paths is determined from the arrival times of the first header portions of the headers received from the paths.

3. A method as claimed in claim 1, in which the portions from the paths are subjected to delays such that the portions of a cell may be retrieved in the order in which they were transmitted.

4. A method as claimed in claim 1, in which the header of each idle cell includes a second header portion characteristic of an idle cell header, the arrival of the second header portion from a path being used to confirm the earlier reception of a first header portion from that path.

5. A method as claimed in claim 1, in which the signal is in the form of a series of Asynchronous Transfer Mode cells.

6. A method as claimed in claim 2, in which the portions from the paths are subjected to delays such that the portions of a cell may be retrieved in the order in which they were transmitted.

7. A method as claimed in claim 2, in which the header of each idle cell includes a second header portion characteristic of an idle cell header, the arrival of the second header portion from a path being used to confirm earlier reception of a first header portion from that path.

8. A method as claimed in claim 2, in which the signal is in the form of a series of Asynchronous Transfer Mode cells.

* * * * *